G. L. JOHNSON.
GAME TRAP.
APPLICATION FILED MAY 7, 1909.
969,958.
Patented Sept. 13, 1910.
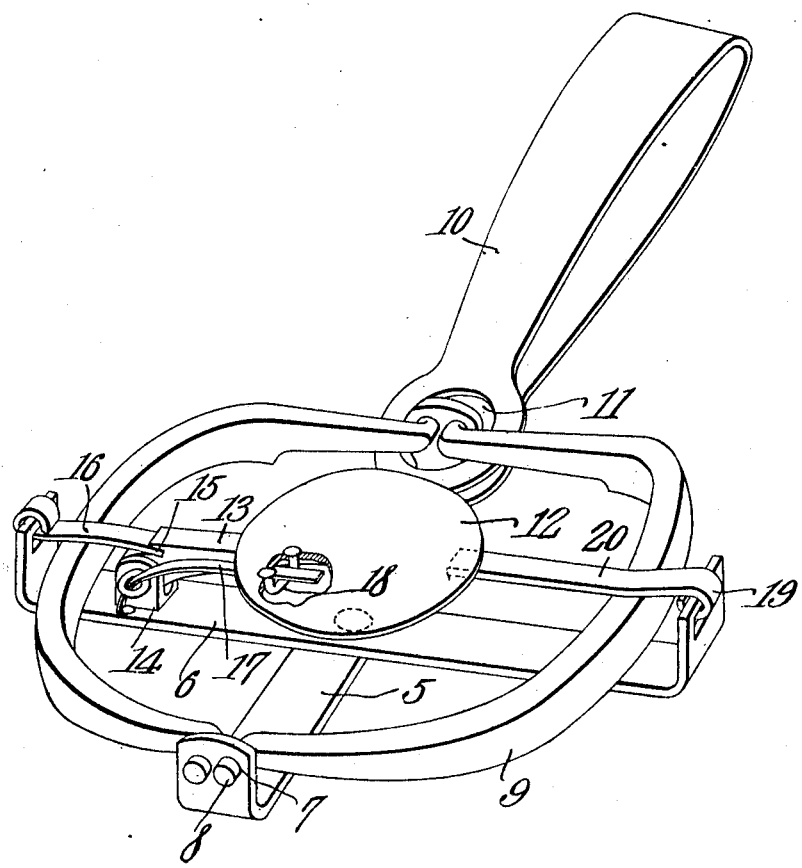

UNITED STATES PATENT OFFICE.

GEHARD L. JOHNSON, OF COTTONWOOD, SOUTH DAKOTA.

GAME-TRAP.

969,958.  Specification of Letters Patent.  Patented Sept. 13, 1910.

Application filed May 7, 1909. Serial No. 494,536.

*To all whom it may concern:*

Be it known that I, GEHARD L. JOHNSON, a citizen of the United States, residing at Cottonwood, in the county of Stanley and State of South Dakota, have invented a new and useful Game-Trap, of which the following is a specification.

It is the object of the present invention to provide an improved construction of trap of that class known as jaw traps, and the invention aims to provide such a construction of trap as will not be liable to become accidentally sprung nor disarranged so as to obviate its actuation should an animal step upon the same. Heretofore, in traps of this class, usually but one of the operating jaws has been engaged by the trip means or devices of the trap, and it frequently happens, in the use of such traps, that an animal in approaching the trap will strike against and throw over the free jaw of the trap to position upon the jaw which is engaged by the trip means of the trap, so that even should the animal step upon the trip plate, the trap, while being sprung, would not act to grip the animal's limb.

It is therefore, the object of the invention to provide in the trap construction, means adapted to engage with this ordinarily free jaw, thereby to prevent its being thrown over by accident.

It is a further object of the invention to provide means for holding the trip mechanism of the trap under an extraordinarily high degree of tension so that it may not be actuated by the smaller animals, birds, frogs and the like.

In the drawings, there is shown a perspective view of a trap constructed in accordance with the present invention.

In the said view, the reference numerals 5 and 6 indicate bars secured together in crossed relation and constituting the base or frame of the trap to support the jaws and the trip devices. The ends of the bar 5 are turned up at right angles as clearly shown in the drawings and are formed each with a pair of openings 7 which receive pivot studs 8 at the ends of the trap jaws 9, these jaws being of the usual shape or form and being constantly under tension through the instrumentality of a bowed leaf-spring 10 having an eye 11 acting on the jaws as usual.

It will be observed from the drawings, that the spring 10 exerts a tendency to normally hold the jaws 9 together in substantially a vertical position, and that when setting the trap it is necessary that these jaws be forced downwardly and away from each other upon their pivots 8, and, in traps of this class, it is customary to employ a trigger or trip device which engages a finger extending above one of these jaws whereby that jaw (and consequently the other jaw) will be held against springing up until the trigger or trip mechanism or devices of the trap have been actuated.

In order to hold the jaws 9 in open position, there is provided and a trigger or trip plate which is indicated by the numeral 12 supported upon a pivoted arm 13 which is mounted as at 14 upon the frame bar 6 of the trap, the arm 13 being so mounted and positioned as to locate the plate 12 at a point between these jaws, or in other words directly above the point of intersection of the two frame bars 5 and 6.

As is usual, the arm 13 is formed with a notch 15 in which engages the extremity of a pivoted detent finger 16 which extends above one of the jaws 9 of the trap when the same is swung down to open position, as shown in the drawings and serves, by such engagement, to hold the jaw against upward swinging movement under the action of the spring 10, as long as the extremity of the finger is engaged in the notch 15 in the arm 13.

The trap, as far as its structural details have been pointed out, is of the ordinary type as will be understood and the novelty which it embodies and by which the new and advantageous results are obtained will now be described.

Secured at one end to the base bar 6 and the bearing 14 to which the arm 13 is pivoted, is a leaf-spring 17, the other end of which engages through a bail 18 upon the under side of the trigger or trip plate 12, the tendency exerted by this spring being to force the said plate upwardly so that a greater weight will be required to depress the same and cause disengagement of the free extremity of the detent finger 16 from the notch 15 in the arm 13, than would be the case if the spring was not employed. It will be seen from the foregoing that by providing the spring 17, the trigger or trip plate is placed under an extraordinarily high degree of tension and that inasmuch as considerable weight will be required to depress the same, it is not likely that the trap will be sprung by smaller animals such as rabbits etc., it being designed chiefly for use in trapping larger game. Pivoted at 19 to the other end of the bar 6 of the frame of the trap is a detent finger 20, which, when the jaws 9 are swung down to open position, is engaged over the other jaw 9 and at its extremity beneath the trigger or trip plate 12.

From the foregoing description of the invention it will be understood that when the jaws are swung down to open position, they are both engaged by the holding means and therefore, neither one of the jaws can be thrown over accidentally. It will further be understood that by providing the spring 17, the trigger plate is placed under additional tension and as a consequence a considerable weight will be required to be placed upon the same to depress it.

What is claimed is:—

In a trap, the combination with a base comprising crossed bars having turned up ends, jaws pivoted in an opposite pair of said ends, and a spring for normally closing the jaws; of long and short detents pivoted to the upturned ends of the other bar and adapted to overlie the jaws when open, a bearing mounted on this bar, an arm pivoted therein and having a notch adapted to be engaged by the short detent, a trip plate carried by said arm and having a bail on its under side, the edge of the plate being engaged by the inner end of the long detent, and a spring carried by said bearing and passing through said bail, for the purpose set forth.

In testimony that I claim the foregoing as my own, I have hereto affixed my signature in the presence of two witnesses.

GEHARD L. JOHNSON.

Witnesses:
J. D. JOHNSON,
J. BERNAU.